J. F. SIMS.
DUST COLLECTOR.
APPLICATION FILED SEPT. 23, 1919.
1,353,431.
Patented Sept. 21, 1920.
3 SHEETS—SHEET 1.
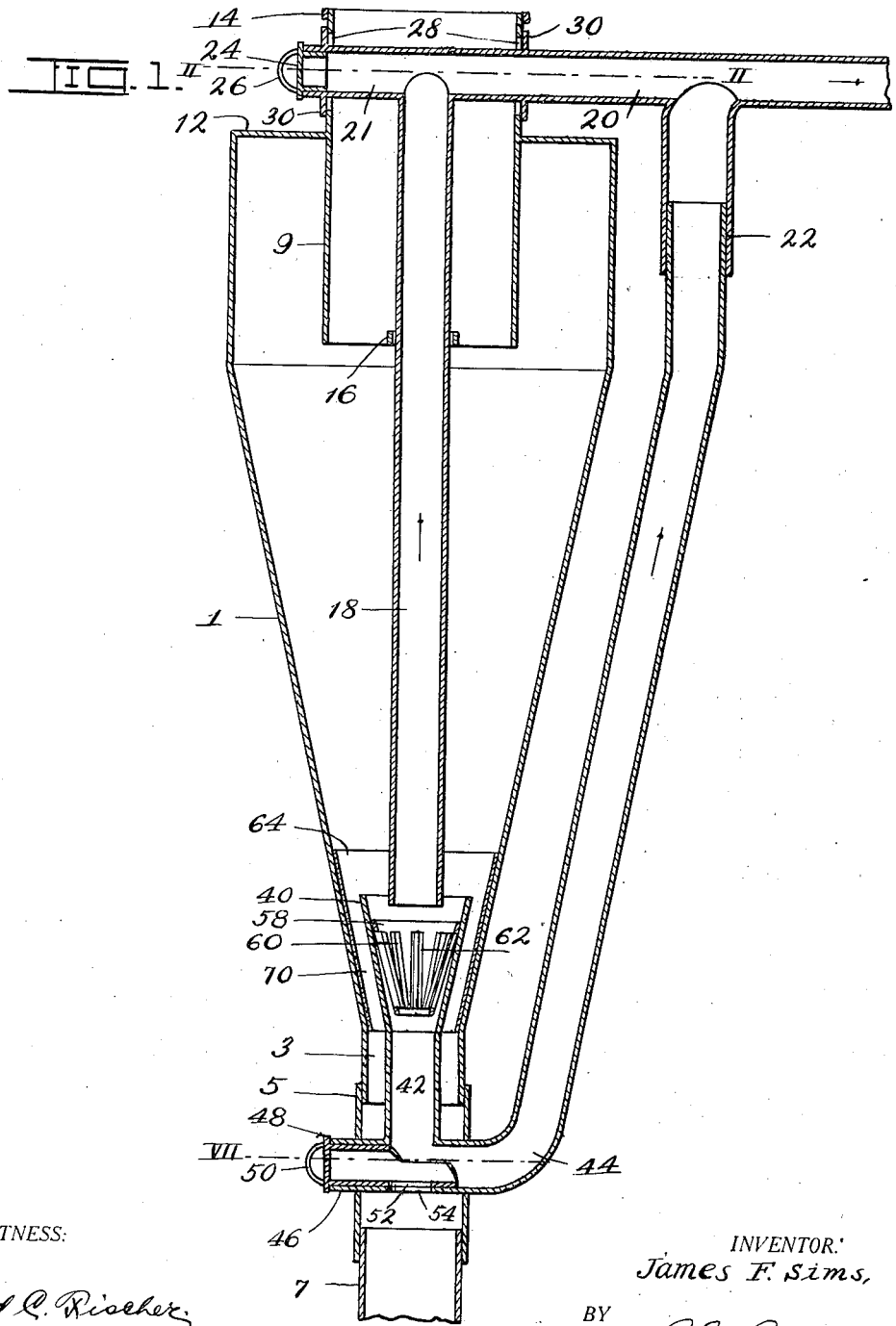
WITNESS:
Fred C. Rischer
INVENTOR:
James F. Sims,
BY
F. G. Fischer,
ATTORNEY.

J. F. SIMS.
DUST COLLECTOR.
APPLICATION FILED SEPT. 23, 1919.
1,353,431.
Patented Sept. 21, 1920.
3 SHEETS—SHEET 2.
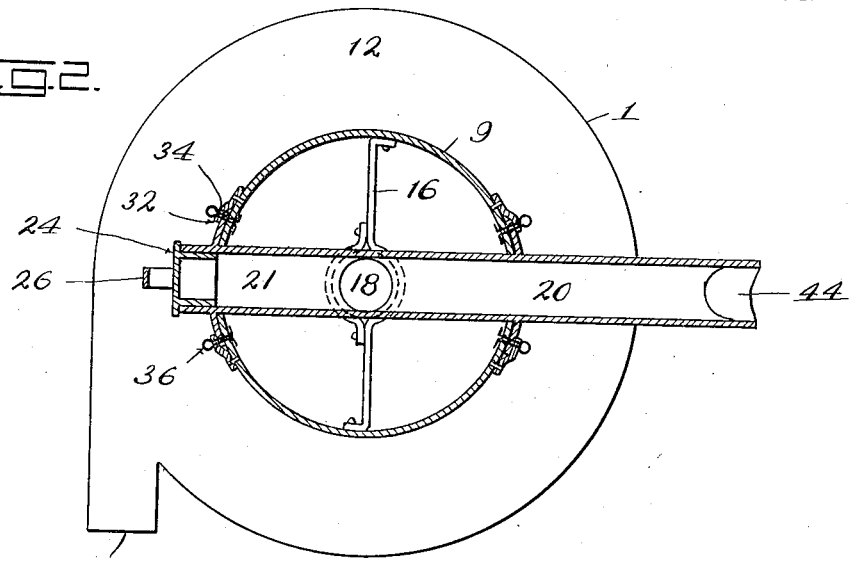
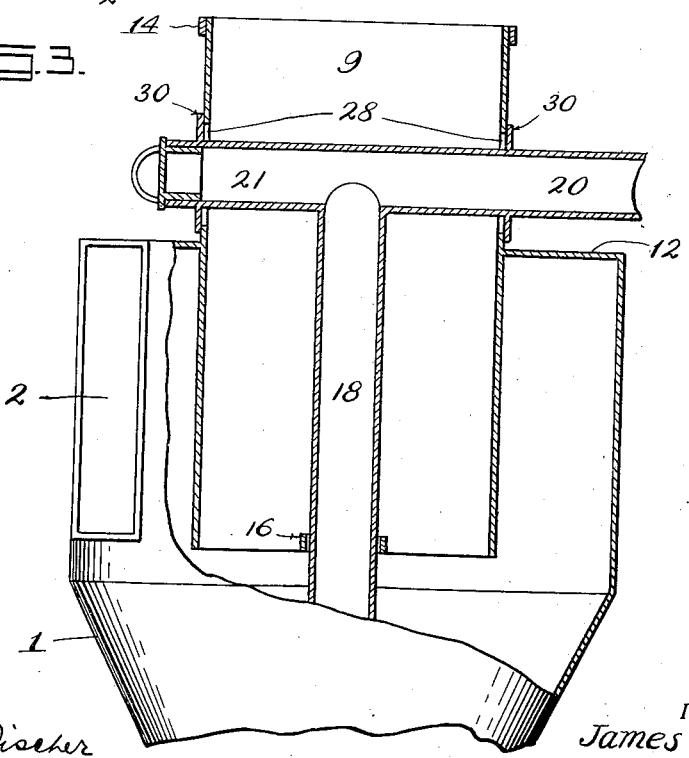
WITNESS:
INVENTOR:
James F. Sims
BY
ATTORNEY.

J. F. SIMS.
DUST COLLECTOR.
APPLICATION FILED SEPT. 23, 1919.
1,353,431.
Patented Sept. 21, 1920.
3 SHEETS—SHEET 3.
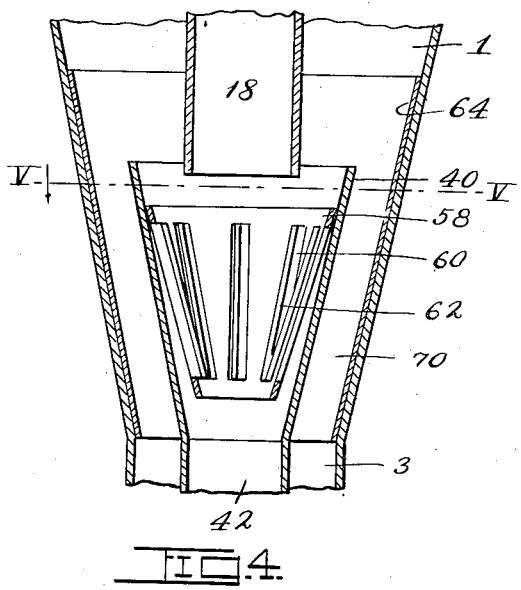
FIG. 4.
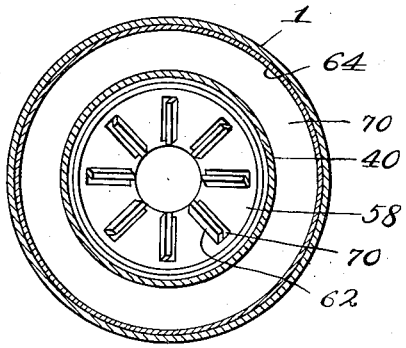
FIG. 5.
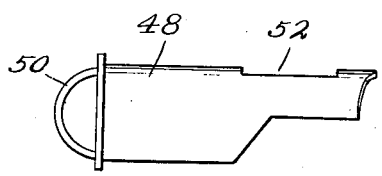
FIG. 6.
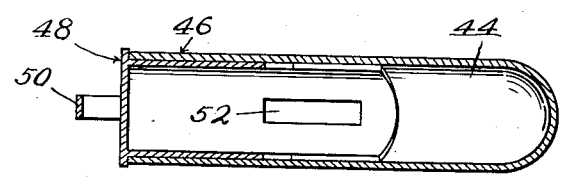
FIG. 8.   FIG. 7.
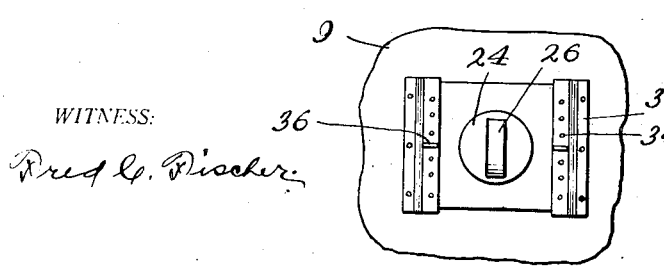
WITNESS:
Fred G. Fischer
INVENTOR:
James F. Sims,
BY
F. G. Fischer,
ATTORNEY.

UNITED STATES PATENT OFFICE.

JAMES F. SIMS, OF KANSAS CITY, MISSOURI.

DUST-COLLECTOR.

1,353,431.          Specification of Letters Patent.     Patented Sept. 21, 1920.

Application filed September 23, 1919. Serial No. 325,686.

*To all whom it may concern:*

Be it known that I, JAMES F. SIMS, a citizen of the United States, residing at Kansas City, in the county of Jackson and State of Missouri, have invented certain new and useful Improvements in Dust-Collectors, of which the following is a specification.

My invention relates to improvements in dust collectors for use, preferably, in flour mills, and one object of the invention is to provide means for spreading the air entering the collector against the outer shell thereof, so that particles of dust or other matter entering with the air becomes separated therefrom and falls to the lower end of the shell from which it is readily removed by suction means as will hereinafter appear.

Other objects of the invention will hereinafter appear, and in order that said invention may be fully understood, reference will now be had to the accompanying drawings, in which:

Figure 1 is a vertical central section of a dust collector built in accordance with the invention.

Fig. 2 is a horizontal section on line II—II of Fig. 1.

Fig. 3 is a broken elevation partly in section, of the upper portion of the dust collector.

Fig. 4 is a broken vertical section of the lower portion of the dust collector.

Fig. 5 is a horizontal section on line V—V of Fig. 4.

Fig. 6 is a detail side elevation of a valve employed in carrying out the invention.

Fig. 7 is an enlarged section on line VII of Fig. 1.

Fig. 8 is a fragmentary elevation of certain parts forming part of the invention.

In carrying out the invention, I employ an inverted conical shell 1 provided at its upper end with an inlet 2, and at its lower end with an outlet 3 for the discharge of dust, stock, etc., collected within the shell.

As disclosed on Fig. 2, the air inlet 2 extends at a tangent to the shell 1 and is long and narrow, so that the air entering said shell will be given a whirling motion to separate it from the dust or other matter with which it is laden.

The lower or outlet end 3 of the shell 1 has a slip joint connection with the upper portion of a coupling member 5, which has a slip joint connection at its lower portion with an outlet pipe 7.

9 designates a tubular guard through which the major portion of the purified air is forced. The lower portion of said guard 9 is arranged concentrically within the upper portion of the shell 1 and is supported by the top 12 of said shell. The upper portion of the guard 9 is reinforced by a metal band 14 and its lower portion is provided with a transverse brace 16, having a central opening through which a suction tube 18 extends and is held concentrically within said guard 9 and the shell 1. The upper end of the suction tube 18 is provided with branches 20 and 21 extending diametrically through the upper portion of the tubular guard 9. The branch 20 is of sufficient length to carry off the dust laden air to any desired point, while the branch 21 terminates a short distance outside of the guard 9 and is provided with a removable cap 24 having a handle 26. On removing the cap 24 any dust lodged within the branches 20 and 21 may be cleaned out.

In order that the suction tube 18 and its branches 20 and 21 may be adjusted vertically the guard 9 is provided with vertical slots 28 through which air is prevented from escaping around the branches 20 and 21 by collars 30, carried by said branches and adjustably mounted in slideways 32 secured to the adjacent portions of the guard 9. The slideways 32 are provided adjacent their vertical margins with perforations 34 adapted to receive cotter pins or other fastening devices 36 extending through the collars 30 to hold the same and the suction tube 18 at any point of their adjustment.

The lower end of the suction tube 18 terminates adjacent to a funnel 40 arranged concentrically within the lower portion of the shell 1 and connected at its lower reduced end to a lower suction tube 42, arranged axially within the outlet 3 and the coupling 5 and provided with branches 44 and 46 extending diametrically through opposite sides of said coupling 5. The branch 44 extends upwardly outside of the shell 1 and connects with the tube 20 through a slip joint 22 whereby its lower portion may be adjusted vertically with the coupling 5 and its upper portion adjusted vertically with the tube 20. The branch 46 is provided with a removable valve 48 having a handle 50, whereby it may be either rotated or withdrawn from the branch 46, so that the latter and the branch 44 may be cleaned out. The valve 48 is provided at its lower side with a port 52 adapted to register with a port 54 at the juncture of the branches 44 and 46 to establish communication between the tube 42 and the outlet pipe 7.

The funnel 40 surrounds a smaller funnel 58 having longitudinal slots 60 and deflectors 62, for a purpose which will hereinafter appear. The lower portion of the conical shell 1, is provided with a smooth tin lining 64 to prevent dust from lodging at this point and clogging the reduced portion of said shell.

In practice the dust laden air enters through the tangential inlet 2 and on impinging against the inner surface of the shell 1 is given a whirling motion whereby the major portion of the dust is separated from the air. The major portion of the purified air is forced out through the upper end of the guard 9, while the dust being heavier falls to the lower portion of the shell 1, where the tendency for it to pack in the reduced area is largely overcome by the bright smooth lining 64, over which it readily slides. The pressure of the air is also reduced through the intermediacy of the funnels 40 and 58, the upper portion of the former dividing the air, the greater portion of which passes down and through the annular space 70 between the shell 1 and said funnel 40 and carries the dust through the outlet 7. The pressure in the space 70 may be increased by raising the funnel 40, which increases the area of the passageway 70, such adjustment being possible by adjusting the coupling 5 vertically on the outlet 3 of the shell 1.

When the air divides at the top of the funnel 40 it is liable to carry with a whirling motion a small amount of dust into said funnel 40 and the funnel 58, where said dust impinges against the deflectors 62 and falls through the slots 60 into the suction tube 42, from which it escapes through the tube 44 and the ports 52 and 54 when the same are open as disclosed on Fig. 1.

At times the power varies which drives the fans, not shown, that creates the suction in the tubes 18 and 44, causing the vortex of the whirling air to assume higher and lower positions in the shell 1 and sometimes out of range of the funnels 40 and 58. In such cases the upper suction tube 18 assumes the duties of the lower suction tube 42 and carries off the dust.

From the foregoing description it is apparent that I have produced a dust collector embodying the advantages above pointed out, and while I have shown and described the preferred construction of the invention I reserve the right to make such changes in the construction, combination and arrangement of parts as properly fall within the spirit and scope of the claims.

Having thus described my invention, what I claim and desire to secure by Letters Patent, is:

1. In a device of the character described, a conical shell having inlet and outlet openings, a tubular guard at the upper portion of said shell, a suction tube extending upwardly from the lower portion of the shell, branches extending from the upper portion of said suction tube and out through openings in the guard, and means to effect vertical adjustment of said branches in the guard.

2. In a device of the character described, a conical shell having inlet and outlet openings, a tubular guard at the upper portion of said shell, a suction tube extending upwardly from the lower portion of the shell, branches extending from the upper portion of said suction tube and out through openings in the guard, slideways on the guard adjacent said openings, collars on the branches capable of vertical adjustment in said slideways, and means for securing said collars at any point of their adjustment.

3. In a device of the character described, a conical shell having inlet and outlet openings, a tubular guard at the upper portion of said shell, a suction tube extending upwardly from the lower portion of the shell, branches extending from the upper portion of said suction tube and out through openings in the guard, means to effect vertical adjustment of said branches, and a removable cap associated with one of the branches.

4. In a device of the character described, a conical shell having inlet and outlet openings, a suction tube extending through the upper portion of said shell, a funnel in the lower portion of the shell, a suction tube leading from the lower portion of said funnel, and means for adjusting said suction tube and the funnel vertically.

5. In a device of the character described, a conical shell having inlet and outlet openings, a suction tube extending through the upper portion of said shell, a funnel in the lower portion of the shell and of less diameter than the latter to leave an annular passageway, a suction tube leading from the lower portion of said funnel, and a second funnel within the first one and provided with slots and deflectors, for the purpose described.

6. In a device of the character described, a conical shell having inlet and outlet openings, a suction tube extending through the upper portion of said shell, a funnel in the lower portion of the shell, a suction tube leading from the lower portion of said funnel, branch pipes leading from the lower end of the last-mentioned suction tube, an outlet pipe disposed below said branch pipes, and a coupling carrying the branch pipes and capable of vertical adjustment on said outlet pipe and the lower end of the conical shell.

7. In a device of the character described, a conical shell having inlet and outlet openings, a suction tube extending through the upper portion of said shell, a funnel in the lower portion of the shell, a suction tube leading from the lower portion of said funnel, branch pipes leading from the lower end of the last-mentioned suction tube, an outlet pipe disposed below said branch pipes, a coupling carrying the branch pipes and capable of vertical adjustment on said outlet pipe and the lower end of the conical shell.

8. In a device of the character described, a conical shell having inlet and outlet openings, a suction tube extending through the upper portion of said shell and capable of vertical adjustment, a funnel in the lower portion of the shell, a suction tube leading from the lower portion of said funnel and having a slip joint connection with the upper portion of the first suction tube.

9. In a device of the character described, a conical shell having an inlet at its upper portion, an outlet pipe leading from the lower portion of said shell, a suction tube extending through the upper portion of the shell, a funnel in the lower portion of the shell, a suction tube leading from the lower portion of the funnel, and a valve in the last-mentioned suction tube to control communication between the same and the outlet pipe.

In testimony whereof I affix my signature, in the presence of two witnesses.

JAMES F. SIMS.

Witnesses:
F. G. FISCHER,
L. J. FISCHER.